United States Patent
Nakazono et al.

(10) Patent No.: US 8,742,947 B2
(45) Date of Patent: Jun. 3, 2014

(54) PARKING SPACE MONITORING DEVICE

(75) Inventors: Masahiro Nakazono, Ise (JP); Naoya Azuma, Otsu (JP); Kazumasa Yamauchi, Hikone (JP); Chiaki Izumoto, Watarai (JP)

(73) Assignee: Panasonic Corporation, Osaka (JP)

( * ) Notice: Subject to any disclaimer, the term of this patent is extended or adjusted under 35 U.S.C. 154(b) by 250 days.

(21) Appl. No.: 12/933,804

(22) PCT Filed: Mar. 24, 2009

(86) PCT No.: PCT/JP2009/055815
§ 371 (c)(1),
(2), (4) Date: Sep. 21, 2010

(87) PCT Pub. No.: WO2009/119577
PCT Pub. Date: Oct. 1, 2009

(65) Prior Publication Data
US 2011/0022269 A1    Jan. 27, 2011

(30) Foreign Application Priority Data
Mar. 25, 2008 (JP) .................... 2008-079060

(51) Int. Cl.
*G08G 1/14* (2006.01)
*G07B 15/02* (2011.01)
*B62D 15/02* (2006.01)
*G05D 1/02* (2006.01)

(52) U.S. Cl.
CPC .............. *G08G 1/14* (2013.01); *B62D 15/027* (2013.01); *B62D 15/028* (2013.01); *G07B 15/02* (2013.01); *G05D 1/021* (2013.01)

USPC .............. 340/932.2; 701/36; 701/41; 367/99

(58) Field of Classification Search
USPC ........ 701/41, 23, 36; 340/943, 932.2; 73/599; 367/99
See application file for complete search history.

(56) References Cited

U.S. PATENT DOCUMENTS
6,492,902 B2 * 12/2002 Nishimoto et al. ............ 340/506
6,999,003 B2 *  2/2006 Matsukawa et al. ........ 340/932.2
(Continued)

FOREIGN PATENT DOCUMENTS
DE    102005046827 A1    6/2006
EP         1470967 A1   10/2004
(Continued)

OTHER PUBLICATIONS

Office Action dated Jan. 5, 2012 for counterpart German Application No. 112009000681.7.

*Primary Examiner* — Thomas Tarcza
*Assistant Examiner* — Tyler J Lee
(74) *Attorney, Agent, or Firm* — Wolf, Greenfield & Sacks, P.C.; Randy J. Pritzker

(57) ABSTRACT

A parking space monitoring device that calculates a parking space with higher accuracy. The parking space monitoring device includes an obstacle detection unit (2, 3, 4) that uses a relative distance (Ri) and relative angle (θi) between an obstacle (Cp) near a vehicle (1) and the vehicle to detect a relative position (Pi(R1, θi)) of the obstacle with respect to the vehicle, a memory (8) that stores the relative position (Pi) detected by the obstacle detection unit in association with movement information of the vehicle, and a parking space calculation unit (7) that calculates a parking space based on the relative information (Pi) and the movement information that are stored in the memory.

9 Claims, 7 Drawing Sheets

(56) References Cited

U.S. PATENT DOCUMENTS

| | | | |
|---|---|---|---|
| 7,295,227 B1* | 11/2007 | Asahi et al. | 348/118 |
| 7,420,876 B2* | 9/2008 | Sugiura | 367/99 |
| 7,540,194 B2* | 6/2009 | Sugiura et al. | 73/649 |
| 8,020,447 B2* | 9/2011 | Okuda et al. | 73/628 |
| 8,099,214 B2* | 1/2012 | Moshchuk et al. | 701/41 |
| 8,130,120 B2* | 3/2012 | Kawabata et al. | 340/908 |
| 8,144,031 B2* | 3/2012 | Kawabata et al. | 340/908 |
| 2006/0196272 A1* | 9/2006 | Sugiura et al. | 73/599 |
| 2009/0121899 A1* | 5/2009 | Kakinami et al. | 340/932.2 |
| 2010/0033348 A1* | 2/2010 | Kawabata et al. | 340/932.2 |
| 2010/0066515 A1* | 3/2010 | Shimazaki et al. | 340/435 |
| 2011/0082613 A1* | 4/2011 | Oetiker et al. | 701/25 |

FOREIGN PATENT DOCUMENTS

| | | |
|---|---|---|
| EP | 1908641 A1 | 4/2008 |
| JP | 08-255250 | 10/1996 |
| JP | 10-206117 | 8/1998 |
| JP | 2003-285705 A | 10/2003 |
| JP | 2004-253912 A | 9/2004 |
| JP | 2006-007875 A | 1/2006 |
| JP | 2007-131169 A | 5/2007 |
| JP | 2007-255976 A | 10/2007 |
| WO | WO 2006/090736 A1 | 8/2006 |
| WO | WO 2007/013489 A1 | 2/2007 |
| WO | WO 2007/046336 A1 | 4/2007 |

* cited by examiner $Xi = Xsi + Ri \cdot \sin(\alpha - \theta i)$
$Yi = Ysi + Ri \cdot \cos(\alpha - \theta i)$ $Xi = Xsi + Ri \cdot \sin(\alpha + \beta - \theta i)$
$Yi = Ysi + Ri \cdot \cos(\alpha + \beta - \theta i)$

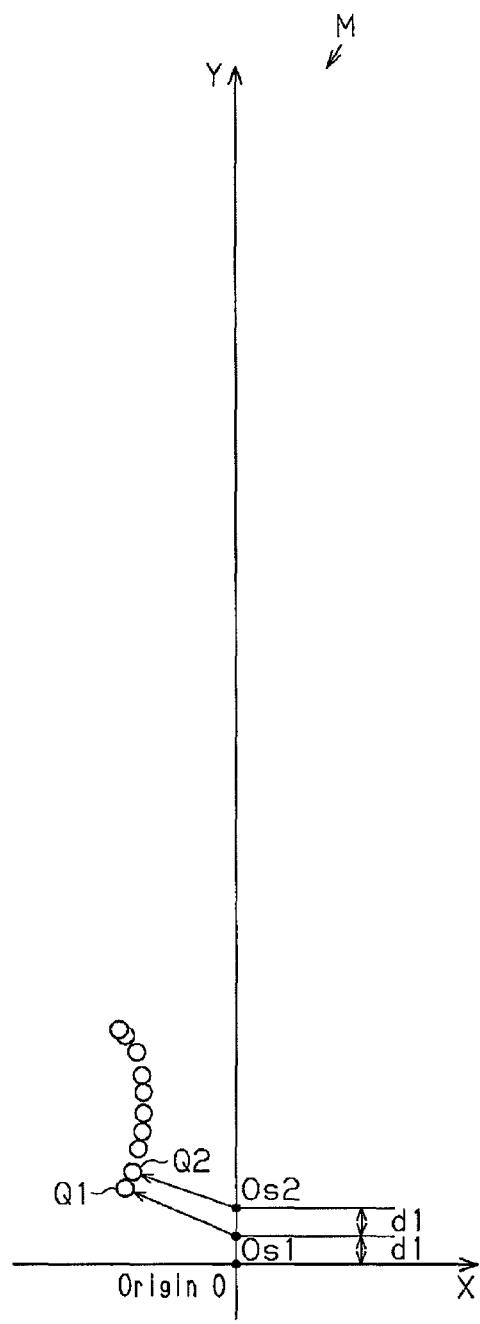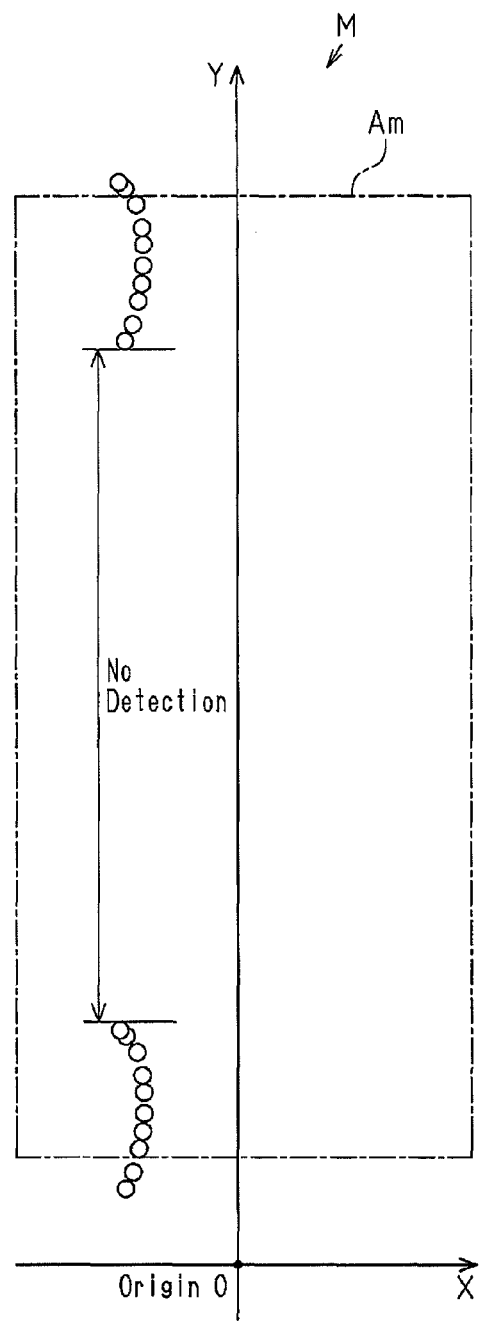

PARKING SPACE MONITORING DEVICE

TECHNICAL FIELD

The present invention relates to a parking space monitoring device for monitoring a parking space to assist parking.

BACKGROUND ART

When parking a vehicle in a parking lot, it is difficult to recognize the locations of obstacles and other parked vehicles, and high driving skills are thus necessary to park a vehicle. Hence, various types of parking assistance devices have been proposed to assist parking. Patent document 1 describes an example of a parking assistance device that uses an ultrasonic sensor and a vehicle speed sensor to detect the distance from the vehicle to a parked vehicle located near the vehicle before the vehicle starts to move in reverse. The parking assistance device stores detected distance data and travel distance data of the vehicle. The parking assistance device calculates the length of a parked vehicle in the travel direction of the vehicle from the travel distance data. When doing so, the parking assistance determines the size of the parked vehicle to be shorter than the parked vehicle length that is obtained by integrating the detected distance data and sets a parking target region (parking space). The parking assistance device obtains the positional relationship with the parking target region to perform driving assistance for parking.

In the parking assistance device of patent document 1, the width of the parked vehicle is calculated to be shorter than the detected parked vehicle length for reasons that will now be discussed. The above-described ultrasonic sensor has a detection range having the shape of a fan or a long oval. Thus, an obstacle such as a parked vehicle is detected as long as it is located in the detection range even when the obstacle is not located in front of the ultrasonic sensor.

In this manner, the shortening of the calculated length of the detected obstacle (parking vehicle), that is, the correction made so that the calculated length becomes close to the actual length of the obstacle, allows for the parking space to be accurately calculated to a certain degree. However, the actual size of the obstacle is not accurately detected. Thus, even when corrections are made, the parking space may not be accurately calculated. Accordingly, there is a demand for a parking space monitoring device that calculates the parking space with higher accuracy.

Patent Document 1: Japanese Laid-Open Patent Publication No. 2006-7875

SUMMARY OF THE INVENTION

The present invention provides a parking space monitoring device that calculates a parking space with higher accuracy.

One aspect of the present invention is a parking space monitoring device. The device includes an obstacle detection unit that uses a relative distance and relative angle between an obstacle near a vehicle and the vehicle to detect a relative position of the obstacle with respect to the vehicle, a memory that stores the relative position detected by the obstacle detection unit in association with movement information of the vehicle, and a parking space calculation unit that calculates a parking space based on the relative information and the movement information that are stored in the memory.

A further aspect of the present invention is a method for monitoring a parking space. The method includes detecting an obstacle near a vehicle with a sensor, determining a relative position of the obstacle and vehicle by calculating a relative distance and a relative angle of the obstacle and vehicle based on the detection with a control unit, and determining the parking space based on the relative position and movement information of the vehicle.

BRIEF DESCRIPTION OF THE DRAWINGS

FIGS. 6A and 6B are diagrams showing two-dimensional maps;

DETAILED DESCRIPTION OF THE EMBODIMENTS

A parking space monitoring device according to one embodiment of the present invention applied to a parking assistance device will now be discussed with reference to FIGS. 1 to 8.

<Entire Structure>

Figure 1:
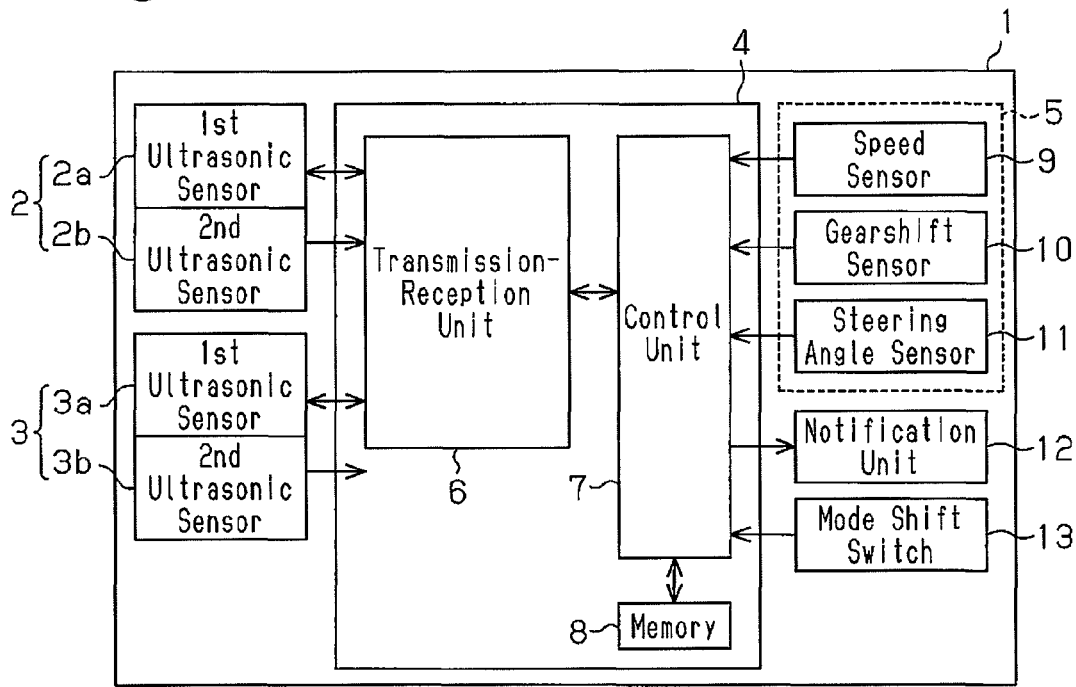
FIG. 1 is a block diagram showing the structure of a parking assistance device.

As shown in FIG. 1, the parking assistance device for a vehicle 1 includes a left ultrasonic sensor 2, a right ultrasonic sensor 3, a controller 4, and a vehicle information output unit 5. The left ultrasonic sensor 2 and right ultrasonic sensor 3 transmit and receive ultrasonic waves to detect on obstacle located near the vehicle 1. The controller 4 performs various computations based on detection results from the left ultrasonic sensor 2 and right ultrasonic sensor 3. The vehicle information output unit 5 detects various information of the vehicle 1 and outputs the information to the controller 4. The parking assistance device further includes a notification unit 12 and a mode shift switch 13. The notification unit 12 serves as a notification means that generates voice guides and warnings based on commands from the controller to assist driving when the driver parks the vehicle 1. The mode shift switch 13 switches between an obstacle detection mode, which is for giving notifications of the presence of an obstacle detected by the ultrasonic sensors 2 and 3, and a parking space calculation mode, which is for calculating a parking space. The mode shift switch 13 is arranged near the driver seat. As one example, the obstacle detection means includes the left ultrasonic sensor 2, the right ultrasonic sensor 3, and the controller 4 but is not limited in such a manner.

As shown in FIG. 2, the left ultrasonic sensor 2 and the right ultrasonic sensor 3 respectively include first ultrasonic sensors 2a and 3a and second ultrasonic sensors 2b and 3b and are arranged on the left and right surfaces of the vehicle 1. Specifically, the first ultrasonic sensors 2a and 3a are combined transmission-reception ultrasonic sensors that transmit ultrasonic waves sideward from the vehicle 1 and receive the ultrasonic waves (reflection waves) reflected from obstacles near the vehicle 1. The second ultrasonic sensors 2b and 3b are ultrasonic sensors that only receive ultrasonic waves. The first ultrasonic sensors 2a and 3a and the second ultrasonic sensors 2b and 3b are arranged in a single housing (not shown) for each of the ultrasonic sensors 2 and 3 and spaced apart by a predetermined distance (sensor distance) Ds in the longitudinal direction of the vehicle 1.

As shown in FIG. 1, the controller 4 includes a control unit 7 that transmits ultrasonic waves in a predetermined transmission cycle from the ultrasonic sensors 2 and 3 through a transmission-reception unit 6 and receives reflection waves of the ultrasonic waves from an obstacle through the transmission-reception unit 6. The control unit 7 stores relative position information from the transmission-reception unit 6 associated with movement information of the vehicle 1 from the vehicle information output unit 5 in a memory 8, which serves as a storage means. Further, the control unit 7 functions as a parking space calculation means for calculating a parking space based on the relative position information of an obstacle and movement information of the vehicle 1 stored in a memory 8.

The vehicle information output unit 5 may be any unit that outputs movement information of the vehicle 1 to the control unit 7. For example, the vehicle information output unit 5 includes a speed sensor 9, a gearshift sensor 10, and a steering angle sensor 11. The speed sensor 9 detects the speed of the vehicle 1 that is output as the movement information. The gearshift sensor 10 detects a gearshift position of the transmission that is output as the movement information. The steering angle sensor 11 detects a steering angle of the steering wheel that is output as the movement information. The control unit 7 recognizes whether the vehicle 1 is traveling forward or in reverse based on the gearshift information input from the gearshift sensor 10. The control unit 7 further recognizes the travel direction of the vehicle 1 based on the steering angle input from the steering angle sensor 11 and the speed of the vehicle 1 from the speed information input from the speed sensor 9.

<Detection of Obstacle>

The detection of an obstacle by the left ultrasonic sensor 2 and the right ultrasonic sensor 3 will now be discussed with reference to FIGS. 2A and 2B. Here, the left ultrasonic sensor 2 will be described, and the components and reference characters corresponding to the right ultrasonic sensor 3 will be shown in parentheses. Further, i will be used as a suffix indicating a corresponding value for each predetermined cycle.

Figure 2A:
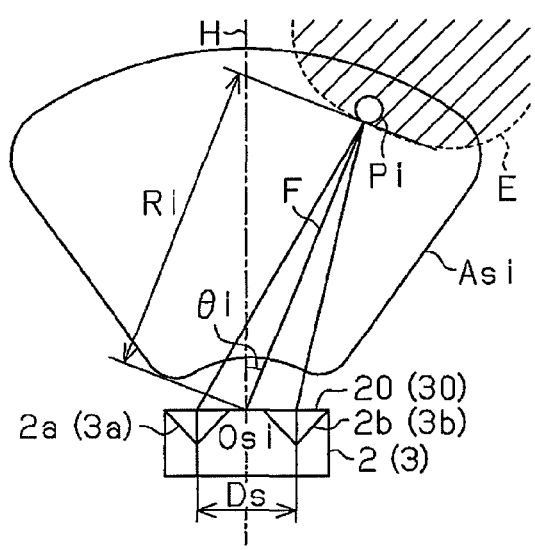
FIG. 2A is a diagram showing an obstacle detection performed by an obstacle detection means.

As shown in FIG. 2A, the left ultrasonic sensor 2 (right ultrasonic sensor 3) transmits ultrasonic waves and forms a fan-shaped detection range Asi in front of a sensor surface 20 (30). For example, when an obstacle E, which is indicated by broken lines, enters the detection range Asi, the left ultrasonic sensor 2 (right ultrasonic sensor 3) receives ultrasonic waves (reflection waves) reflected by the obstacle E. The control unit 7 detects the position at which the distance is minimal from a sensor center Osi, which is the center point of the first ultrasonic sensor 2a (3a) and the second ultrasonic sensor 2b (3b), to the obstacle. This position of the obstacle E is marked by a white circle as a relative position Pi with respect to the vehicle 1, and the control unit 7 acquires the information of the relative position Pi. That is, the control unit 7 uses a relative distance Ri between the sensor center Osi to the position Pi marked by the white circle and a relative angle θi between a sensor normal H, which extends through the sensor center Osi and is perpendicular to the sensor surface 20 (30), and a line segment F, which connects the sensor center Osi and the position Pi, to detect the relative position Pi (Ri, θi) of the obstacle E with respect to the vehicle 1.

Figure 2B:
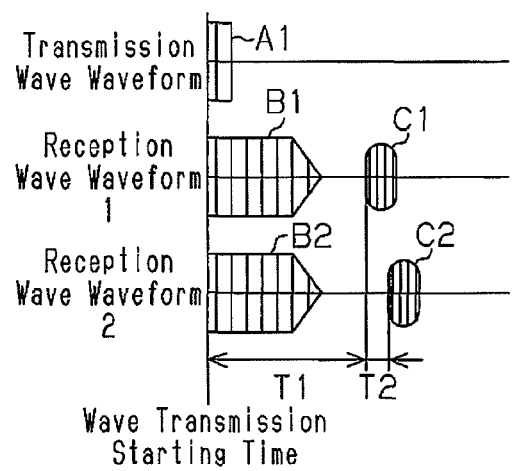
FIG. 2B is a diagram showing the forms of waves transmitted and received by the obstacle detection means.

As described above, when the obstacle E is present in the detection range Asi, referring to FIG. 2B, ultrasonic waves (transmission waves A1) transmitted from the first ultrasonic sensor 2a (3a) is reflected by the obstacle E and received as reflection waves by the first ultrasonic sensor 2a (3a) and the second ultrasonic sensor 2b (3b). In this case, the obstacle E is located closer to the second ultrasonic sensor 2b (3b). Thus, the second ultrasonic sensor 2b (3b) receives reflection waves before the first ultrasonic sensor 2a (3a). More specifically, the second ultrasonic sensor 2b (3b) receives reflection waves C1 after reception time T1 elapses from when the first ultrasonic sensor 2a (3a) transmits ultrasonic waves. The reception time T1 is the time from when the first ultrasonic sensor 2a (3a) transmits ultrasonic waves to when the ultrasonic waves reflected by the obstacle E strikes the second ultrasonic sensor 2b (3b). After a reception time difference T2 elapses from when the second ultrasonic sensor 2b (3b) receives the reflection waves C1, the first ultrasonic sensor 2a (3a) receives the reflection waves C2. At the same time as when the transmission waves A1 are transmitted, the first ultrasonic sensor 2a (3a) and the second ultrasonic sensor 2b (3b) receives reverberation waves B1 and B2.

Referring to FIG. 2A, the principle of triangulation is used to calculate the relative angle θi from the reception time difference T2 of the first ultrasonic sensors 2a and 3a and the second ultrasonic sensors 2b and 3b and the sensor distance Ds between the first ultrasonic sensors 2a and 3a and the second ultrasonic sensors 2b and 3b. The relative distance Ri uses the distance calculated from the reception time (in this case T1) of the ultrasonic sensor located closer to the obstacle E as an approximate value.

<Detection of Parked Vehicle>

The detection of a parked vehicle will now be discussed with reference to FIG. 3. Here, a case in which the vehicle 1 passes by the front of a parked vehicle Cp will be discussed.

Figure 3:
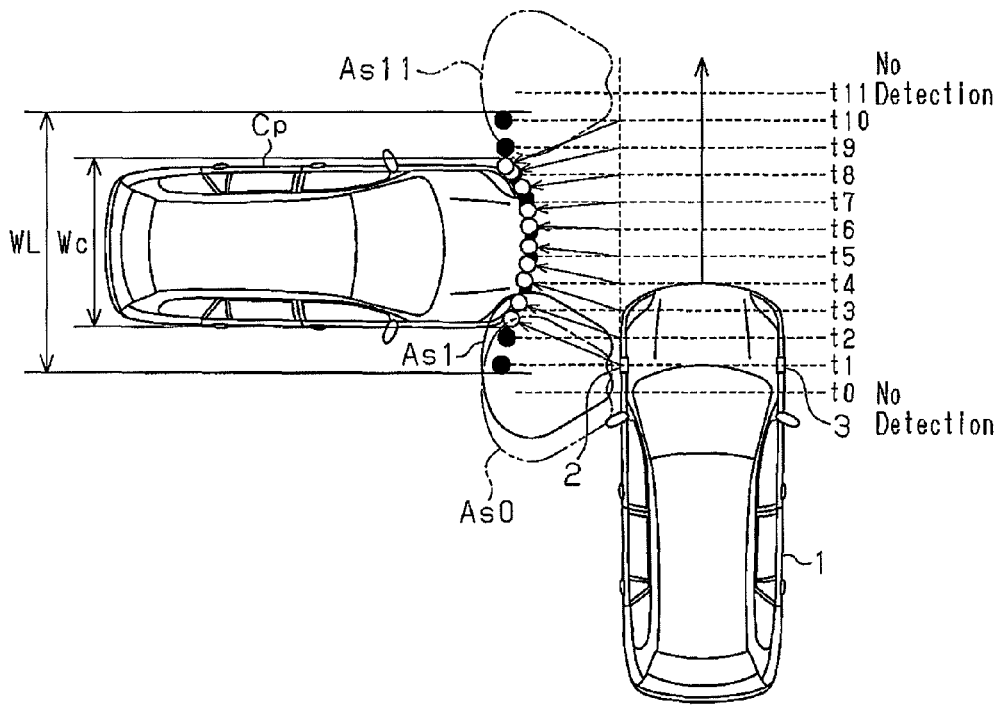
FIG. 3 is a plan view showing the detection of a parked vehicle.

As shown in FIG. 3, in a parking lot or the like, from time t0, the two ultrasonic sensors 2 and 3 form detection ranges As1, As2, . . . at predetermined times t1, t2, . . . , which are in intervals of the transmission cycle of the ultrasonic waves. The two ultrasonic sensors 2 and 3 detect the position at which the distance is minimal from the obstacle (parked vehicle Cp) in the detection ranges As1, As2, . . . , and the control unit 7 acquires information of the relative positions P1, P2, . . . through the transmission-reception unit 6. When an obstacle such as a parked vehicle is not present, the transmitted ultrasonic waves are not reflected. Thus, relative information position is not acquired. The control unit 7 stores in the memory 8 information of the relative positions P1 and P2 associated with the movement information of the vehicle 1 output from the vehicle information output unit 5. In FIG. 3, the relative positions P1, P2, . . . of the parked vehicle Cp, which serves as an obstacle, with respect to the vehicle 1 detected at the predetermined times t1, t2, . . . are marked by white circles. The detection positions detected by the parking assistance device of the prior art are marked by black circles in FIG. 3.

The size of the parked vehicle Cp indicated by the white circles and detected by the parking assistance device of the present embodiment has a higher accuracy than the size of the parked vehicle Cp indicated by the black circles and detected by the parking assistance device of the prior art. This is because the ultrasonic sensors 2 and 3 detect the relative position of an obstacle with respect to the vehicle 1 by additionally using the relative angle in addition to the relative distance of the obstacle from the vehicle. Calculation of the width Wc of the parked vehicle Cp based on the relative positions P1, P2, . . . detected by the parking assistance device of the present embodiment would be more accurate than when measuring the width WL of the parked vehicle Cp indicated by the black circles and measured by the parking assistance device of the prior art.

<Coordinate Conversion to Two-Dimensional Map>

The parking assistance device lays out the associated information of the relative positions P1, P2, . . . and movement information of the vehicle 1 stored in the memory 8 on a parking space map (two-dimensional map) M and calculates the parking space based on the parking space map M.

The process for laying out a detection position Qi of the obstacle calculated from the information of the relative positions P1, P2, . . . and the movement information of the vehicle 1 on a parking space map (two-dimensional map) M will now be discussed with reference to FIGS. 4A and 4B. Each detection position Qi is laid out on a two-dimensional map in which the position of the sensor center Osi at time t0 is referred to as the origin O, the frontward direction of the vehicle 1 is referred to as the Y axis, and the direction orthogonal to the Y axis is referred to as the X axis.

Each relative position Pi stored in the memory 8 is obtained from the relative distance Ri and the relative angle θi of the obstacle with respect to the sensor center Osi. Thus, the control unit 7 adds the movement information of the vehicle 1 stored in the memory 8 to calculate a dummy detection position Qi in the parking space map M. That is, the relative information Pi (Ri, θi) of the obstacle with respect to the sensor center Osi (Xsi, Ysi) is coordinate-converted to the detection position Qi (Xi, Yi) of the obstacle on a two-dimensional map using the movement information of the vehicle 1.

Figure 4A:
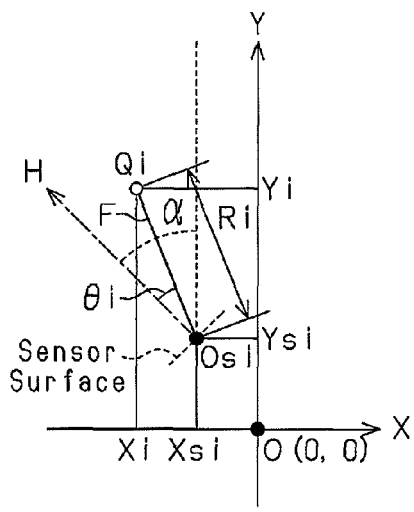
FIGS. 4A and 4B are diagrams showing coordinate conversion of a detection position.

Referring to FIG. 4A, when the angle formed by the Y axis, which is the travel direction of the vehicle 1, and the sensor normal H, which extends through the sensor center Osi and is perpendicular to the sensor surface 20 (30), is defined as the sensor angle α, the detection position Qi (Xi, Yi) is calculated as shown below.

$$Xi = Xsi + Ri \cdot \sin(\alpha - \theta i) \quad \text{(Equation 1)}$$

$$Yi = Ysi + Ri \cdot \cos(\alpha - \theta i) \quad \text{(Equation 2)}$$

Figure 4B:
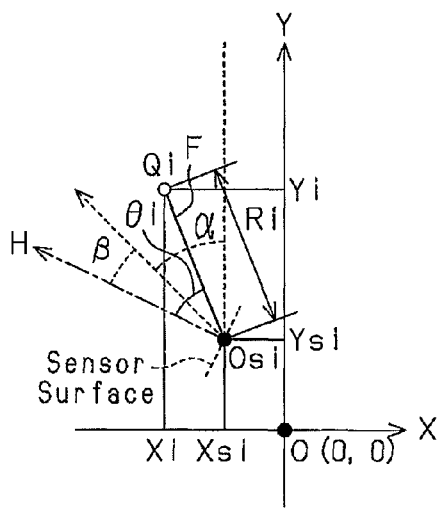

Referring to FIG. 4B, when the travel direction of the vehicle 1 deviates from the Y axis, which is the travel direction of the vehicle 1 at time t0, a vehicle travel angle β, which is the angle of the sensor normal H relative to the travel direction, is calculated based on the steering information from the steering angle sensor 11. Then, the travel angle β is used to calculate the detection position Qi (Xi, Yi) as shown below.

$$Xi = Xsi + Ri \cdot \sin(\alpha + \beta - \theta i) \quad \text{(Equation 3)}$$

$$Yi = Ysi + Ri \cdot \cos(\alpha + \beta - \theta i) \quad \text{(Equation 4)}$$

In this manner, the detection position Qi is calculated from the information of the relative positions P1, P2, . . . and the travel information of the vehicle 1, and the detection position Qi is laid out on the parking space map M. Based on such parking space map M, the control unit 7 recognizes an obstacle such as a parked vehicle and further calculates the parking space, as will be described later, to lower the computation burden. This converts two pieces of information into one piece of information to recognize an obstacle. Thus, computation is facilitated in comparison to when the information of the relative position Pi with respect to the sensor center Osi and the movement information of the vehicle 1 are separately computed to recognize an obstacle.

<Calculation of Parking Space]

The operation of the parking assistance device, which is configured as described above, will now be discussed.

Figure 5:
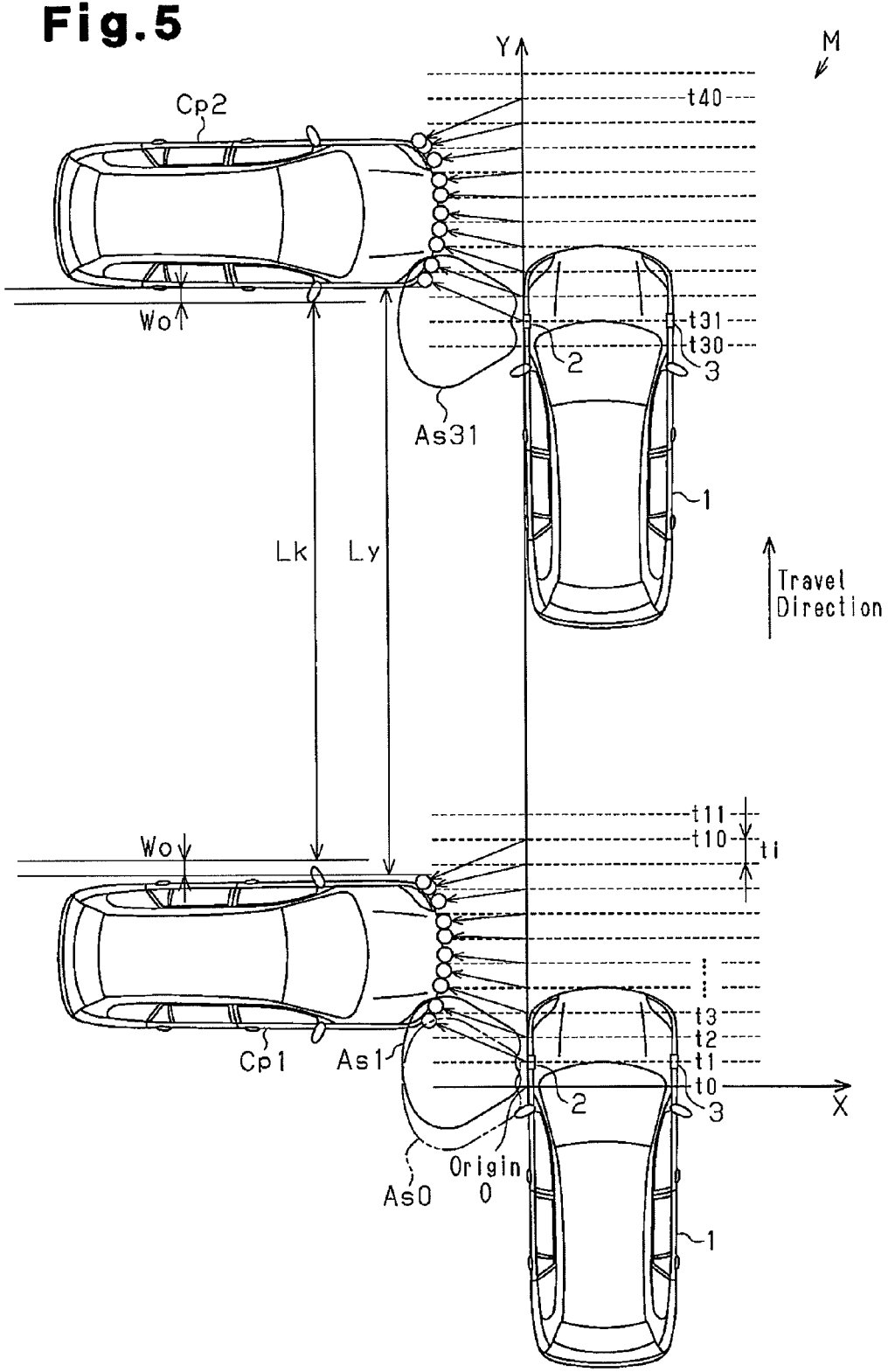
FIG. 5 is a diagram overlapping a two-dimensional map with a plan view showing a parking lot.

Here, as shown in FIG. 5, an example of a case in which the vehicle 1 will be parked between two parked vehicles Cp1 and Cp2, which are parked in parallel and spaced apart from each other, will now be discussed. FIG. 5 shows the parking space map M overlapped with a plan view showing the parking lot.

When entering a parking lot or the like, the driver operates the mode shift switch 13, which serves as a switching means, to switch from the obstacle detection mode, which is normally set, to the parking space calculation mode, which calculates the parking space and determines whether or not parking is possible.

As the vehicle 1 passes by the front of the parked vehicles Cp1 and Cp2, the control unit 7 lays out the information of the relative positions P1, P2, . . . , which are detected from time t0 at the predetermined times t1, t2, . . . by the left ultrasonic sensor 2, as the detection positions Qi on the parking space map M. Whenever the relative position P1 is detected and stored in the memory 8 associated with the movement information of the vehicle 1, the control unit 7 sequentially lays out the detection position Qi on the parking space map M. The procedures for calculating the parking space will now be discussed under the assumption that the vehicle 1 is moving at an equal speed.

The control unit 7 first generates the parking space map M. The origin O of the parking space map M is the position of the sensor center Osi at time t0. Further, at time t0, there is no obstacle in the detection range As0 of the left ultrasonic sensor 2. Thus, an obstacle is not detected, and the control unit 7 does not lay out a detection position Q0 on the parking space map M.

At time t1, the parked vehicle Cp1, which is an obstacle, becomes present in the detection range As1 of the left ultrasonic sensor 2. Thus, the control unit 7 lays out a detection position Q1 on the parking space map M. More specifically, referring to FIG. 6A, the control unit 7 acquires the relative position P1 (R1, θ1) and the movement information (vehicle speed) of the vehicle 1, which are stored in the memory 8. Then, the control unit 7 uses the movement information to calculate the movement distance from time t0 to time t1, that is, the position of the sensor center Os1 relative to the origin O. Here, the vehicle 1 is traveling straight at an equal speed. The movement distance is d1 from time t0 to time t1, and the coordinates of the sensor center Os1 are (0, d1). Equation 1 and equation 2 for coordinate conversion to the above-described two-dimensional map is used to calculate the detection position Q1 (X1, Y1), and the detection position Qi is laid out on the parking space map M. Each of the parameters is Xsi=0, Ysi=d1, Ri=R1, α=90°, and θi=θ1.

$$X1 = R1 \cdot \sin(90° - \theta 1) = R1 \cos \theta 1$$

$$Y1 = d1 + R1 \cdot \cos(90° - \theta 1) = d1 + R1 \sin \theta 1$$

In the same manner, at time t2, the parked vehicle Cp1, which is an obstacle, is present in the detection range As2 of the left ultrasonic sensor 2. Thus, the control unit 7 lays out a detection position Q2 on the parking space map M. More specifically, the control unit 7 acquires a relative position P2 (R2, θ2) and the movement information (vehicle speed) of the vehicle 1, which are stored in the memory 8. Then, the control unit 7 uses the movement information to calculate the movement distance from time t0 to time t2. Here, the vehicle 1 is traveling straight at an equal speed. Thus, the movement distance per unit time is constant. That is, the movement distance d1 is an integrated value of d1 and is thus 2×d1, and the coordinates of the sensor center Os2 at time t2 is (0, 2d1). Equation 1 and equation 2 for coordinate conversion is used to calculate the detection position Q2 (X2, Y2), and the detection position Q2 is laid out on the parking space map M. Each of the parameters is Xsi=0, Ysi=2d1, Ri=R2, α=90°, and θi=θ2.

$$X2 = R2 \cos \theta 2$$

$$Y2 = 2d1 + R2 \sin \theta 2$$

As shown in FIG. 6B, from time t3, the control unit 7 sequentially lays out a detection position Qi on the parking space map M whenever detecting an obstacle at each time ti. At locations where a parked vehicle Cp is not present, there is no detection, and a detection position Qi is not laid out on the parking space map M. As shown additionally in FIG. 5, the control unit 7 lays out the detection positions Q1 to Q10 from time t1 to time t10 and the detection positions Q31 to Q40 from time t31 to time t40 on the parking space map M. From time t11 to time t30, an obstacle is not detected. The control unit 7 thus does not lay out any detection positions Qi on the parking space map M.

Figure 7A:
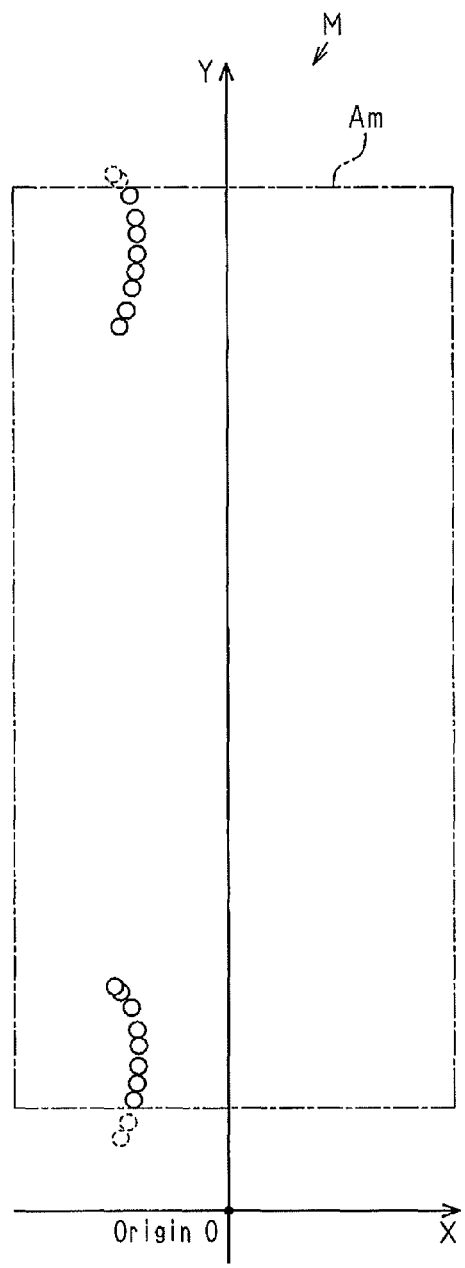
FIGS. 7A and 7B are diagrams showing two-dimensional maps.

As shown in FIG. 7A, the control unit 7 leaves a predetermined number (in the present embodiment, eight) of detection positions Qi in front of and behind a section in which there is continuously no detection, and deletes the other unnecessary detection positions Qi to optimize the map M. More specifically, the control unit 7 calculates the parking space based on the detection positions Qi that are present in the optimization range Am shown by the dashed lines. Such optimization is performed because it may be determined whether or not there is space in which the vehicle 1 can be parked when the distance in which no detection continues is detected. This also reduces the computation amount. Further, to optimize the map M, the control unit 7 deletes the detection positions Qi when consecutive detection positions Q are not detected even though one is detected. As a result, for example, when disturbance affects the ultrasonic sensors 2 and 3 and a detection position Qi is erroneously laid out on the parking space map M, determination that there is no parking space is prevented.

Figure 7B:
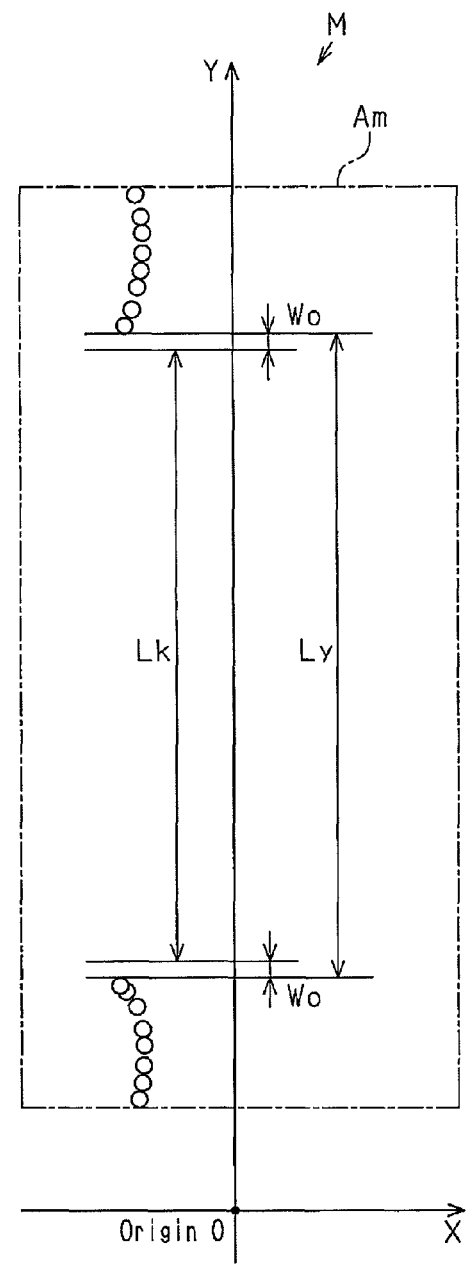

As shown in FIG. 7B, in the optimization range Am, the control unit 7 calculates a non-detection distance Ly over which a non-detection section extends. A detection position Qi is not detected in the non-detection section. The control unit 7 then subtracts a predetermined marginal width Wo from the two sides of the non-detection section to calculate an opening distance Lk over which an opening extends. The opening is an entrance of a parking space. The marginal width Wo is a width that is necessary for providing space required for a vehicle occupant to enter or exit the vehicle 1.

Figure 8:
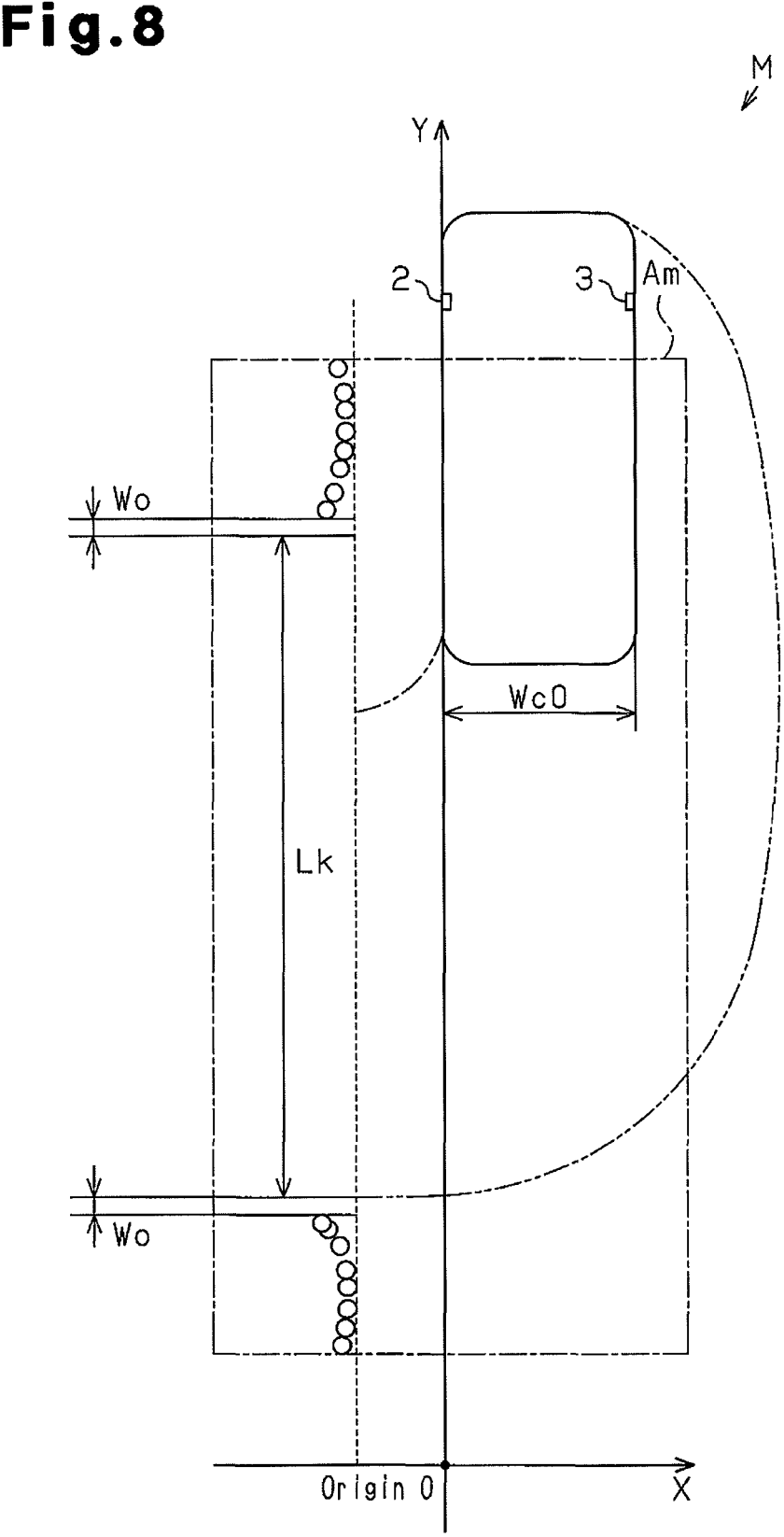
FIG. 8 is a diagram showing a two-dimensional map.

As shown in FIG. 8, when the opening distance Lk is greater than or equal to the width Wc0 of the vehicle 1 (Lk≥Wc0), the control unit 7 determines that parking is possible and issues a notification for guidance to the parking space with the notification unit 12. When the opening distance Lk is less than the width Wc0 of the vehicle 1 (Lk<Wc0), the control unit 7 determines that parking is not possible and issues a notification that parking is not possible with the notification unit 12.

When determining that parking is possible, based on the positional relationship of the present sensor center and the opening, the control unit 7 uses the notification unit 12 to notify the driver of whether to move forward on in reverse in addition to the turning amount and turning direction of the steering wheel to assist parking. For example, the control unit 7 issues a notification such as "turn the steering wheel to the right and drive in reverse" to assist parking.

The length of the parking space is visually checked by the driver when passing by the area between the parked vehicle Cp1 and the parked vehicle Cp2 or when parking the vehicle.

The parking assistance device (parking space monitoring device) of the above embodiment has the advantages described below.

(1) The relative position Pi of an obstacle with respect to the vehicle 1 is detected in predetermined intervals from the relative distance Ri and relative angle θi between an obstacle (parked vehicle Cp) near the vehicle 1 and the vehicle 1. In this manner, the relative angle is used in addition to the relative distance from the parked vehicle Cp. This allows for the relative position Pi of the parked vehicle Cp with respect to the vehicle 1 to be accurately recognized. Further, information of each relative position Pi is associated with the movement information of the vehicle 1 during detection. Thus, by adding the movement position of the vehicle 1 to the accurately recognized relative position Pi, the size of the parked vehicle Cp may be accurately recognized. Moreover, by calculating the parking space from the information of the relative position Pi of the parked vehicle Cp, the parking space is calculated based on the accurate size of the parked vehicle Cp. This calculates the parking space with higher accuracy.

(2) The first ultrasonic sensor 2a (3a) transmits ultrasonic waves, and reflection waves from an obstacle (parked vehicle Cp) are received by the first ultrasonic sensor 2a (3a) and the second ultrasonic sensor 2b (3b). This detects the distance from the parking vehicle Cp to the first ultrasonic sensor 2a (3a) and the distance from the parked vehicle Cp to the second ultrasonic sensor 2b (3b). Further, the relative angle θi between the ultrasonic sensor 2 (3) and the parked vehicle Cp is detected from the difference between the distance from the parking vehicle Cp to the first ultrasonic sensor 2a (3a) and the distance from the parked vehicle Cp to the second ultrasonic sensor 2b (3b) and from the distance Ds between the first ultrasonic sensor 2a (3a) and the second ultrasonic sensor 2b (3b). Thus, the relative position Pi between the vehicle 1 and the parked vehicle Cp is detected from the relative distance Ri and relative angle θi between the parked vehicle Cp and the ultrasonic sensor 2 (3).

(3) The detection position Qi is laid out on the parking space map M based on information of the relative position Pi and movement information of the vehicle 1 to recognize a parking space. That is, two pieces of information are converted into one piece of information. Thus, in comparison to when separately computing information of the relative position Pi and movement information of the vehicle 1 to calculate the parking space, computations for recognizing an obstacle are reduced and calculation of the parking space is facilitated. This, in turn, increases the speed for determining whether or not parking is possible when parking assistance is performed.

(4) Information of the relative position Pi stored as the vehicle 1 moves is sequentially laid out on the parking space map M. Thus, a parking space is recognized without any delays.

(5) The parking space map M is optimized by eliminating the detection positions Qi laid out on the parking space map M except for the predetermined number of detection positions Qi used to calculate the parking space. This decreases the detection positions Qi used for computations and facilitates computations. Further, computations are easily performed when parking assistance is performed with the parking space map M.

(6) The movement information of the vehicle 1 includes the steering information. Thus, even when the driver turns the steering wheel in a direction in which the vehicle 1 does not move straight, the relative position of an obstacle with respect to the vehicle 1 may be accurately detected. This leads to accurate recognition of the parking space.

(7) By switching from the obstacle detection mode to the parking space mode in a parking lot or the like, continuous issuance of warning notifications is prevented.

Second Embodiment

A parking space monitoring device according to a second embodiment of the present invention applied to a parking assistance device will now be discussed with reference to FIG. 9. The parking assistance device of this embodiment differs from the first embodiment in that, in addition to determining whether or not the width of the opening of a parking space is greater than or equal to the width Wc0 of the vehicle 1, the parking assistance device also determines whether or not the length of the parking space is greater than or equal to the longitudinal length, or overall length, of the vehicle 1. The discussion will now center on the differences from the first embodiment.

Figure 9:
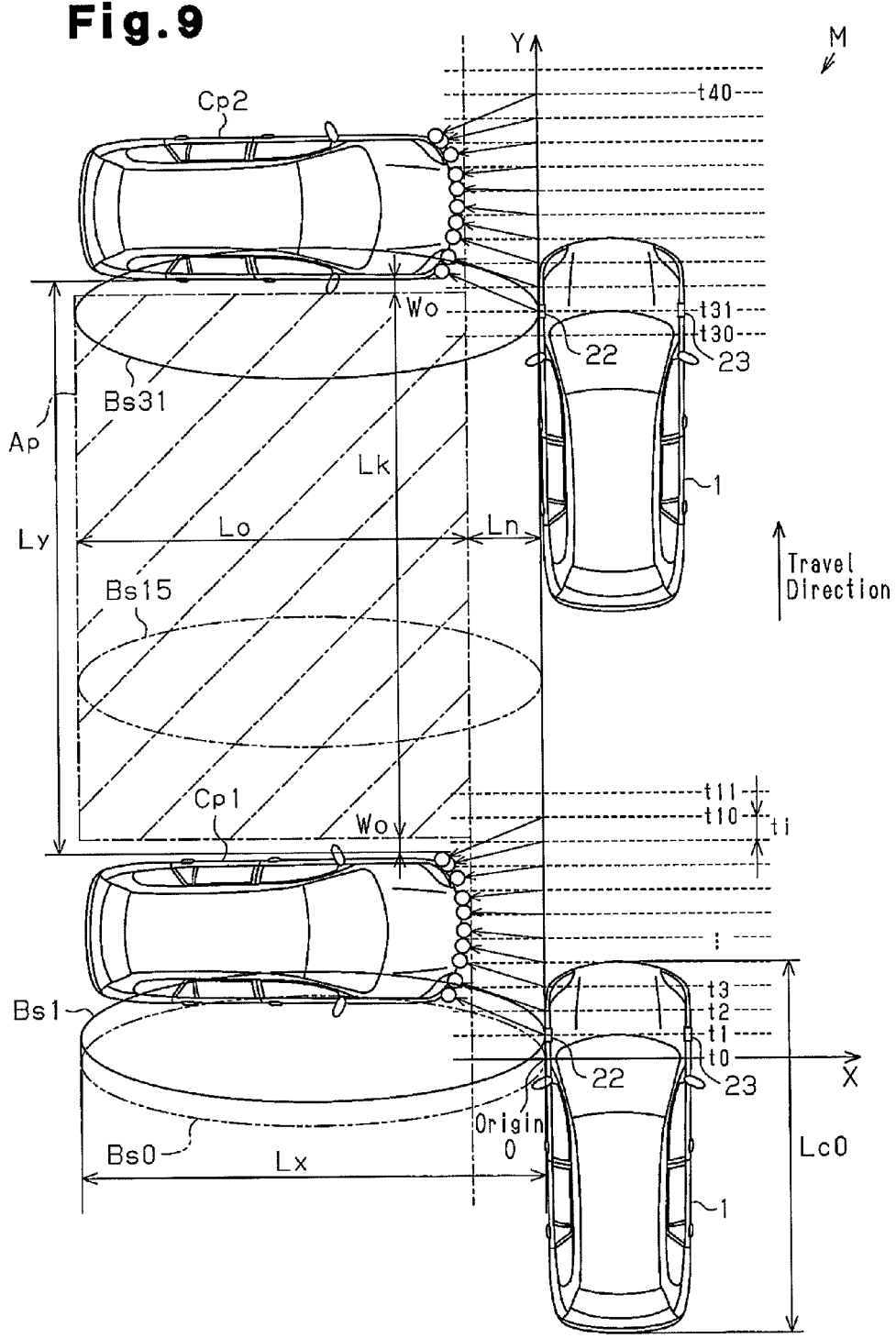
FIG. 9 is a diagram overlapping a two-dimensional map with a plan view showing a parking lot.

As shown in FIG. 9, the vehicle 1 incorporates ultrasonic sensors 22 and 23, each forming a detection range Bsi having the shape of a long oval. The long axis of the detection range Bsi has a length Lx, which is longer than the overall length Lc0 of the vehicle 1 (Lx>Lc0). This allows for calculation of the length of a parking space between a parked vehicle Cp1 and a parked vehicle Cp2, which are parked in parallel, in addition to calculation of the opening width of the vehicle 1 when passing by the front of the parked vehicles Cp1 and Cp2 and thereby allows for determination of whether or not parking of the vehicle 1 is possible.

More specifically, in the same manner as the first embodiment, as the vehicle passes by the front of the parked vehicles Cp1 and Cp2, the control unit 7 of the parking assistance device lays out the detection positions Qi on the parking space map M as information of the relative positions P1, P2, . . . detected by the left ultrasonic sensor 22 from time t0 in intervals of predetermined cycles at times t1, t2, . . . .

At time to, there is no obstacle in the detection range Bs0 of the left ultrasonic sensor 22. Since an obstacle is not detected, the control unit 7 does not lay out a detection position Qi on the parking space map M.

From time t1, the control unit 7 lays out, on the parking space map M, detection position Q1 to detection position Q10 from time t1 to time t10 and detection position Q31 to detection position Q40 from time t31 to time t40. During the period from time t11 to time t30, an obstacle is not detected, and the control unit 7 does not lay out a detection position Qi on the parking space map M. An obstacle is not present in the detection range Bsi of the left ultrasonic sensor 22 from time t11 to time t30. Thus, it may be determined whether or not parking is possible in the longitudinal direction of the parking space.

The control unit 7 calculates a non-detection distance Ly of the non-detection section in which no detection positions Qi are detected. The control unit 7 also subtracts the predetermined marginal width Wo from the two sides of the non-detection section to calculate the opening distance Lk. Further, the control unit subtracts the distance Ln between the left ultrasonic sensor 22 and the distal ends of the parked vehicles Cp1 and Cp2 from the length Lx of the long axis of the detection range Bsi to calculate a longitudinal distance Lo.

Then, the control unit 7 calculates a parking range Ap, which serves as a parking space, from the opening distance Lk and the longitudinal distance Lo to determine whether or not parking of the vehicle 1 in the parking range Ap is possible. When the opening distance Lk is greater than or equal to the width Wc0 of the vehicle 1 (Lk≥Wc0) and the longitudinal distance Lo is greater than or equal to the overall length Lc0 of the vehicle 1 (Lo≥Lc0), the control unit 7 determines that parking is possible and issues a notification for guidance to the parking space with the notification unit 12. When the opening distance Lk is less than the width Wc0 of the vehicle 1 (Lk<Wc0), the control unit 7 determines that parking is impossible and issues a notification that parking is not possible with the notification unit 12. Further, when the opening distance Lk is greater than or equal to the width Wc0 (Lk≥Wc0) but the longitudinal distance Lo is less than the overall length Lc0 of the vehicle 1 (Lo<Lc0), parking is possible. Thus, the control unit 7 issues a notification prompting the driver to be careful of the surroundings when parking the vehicle 1. When there is a wall or the like in the longitudinal direction of the parking space, the wall would be present in the detection range Bsi of the ultrasonic sensors 22 and 23. Thus, the control unit 7 detects a detection position Qi (on the wall surface) and uses the distance from the detection position Qi to a line connecting the distal ends of the parking vehicles Cp1 and Cp2 as a longitudinal distance Lo to calculate the parking space and determine whether or not parking is possible.

The parking assistance device performs parking assistance to park the vehicle 1 in the parking range Ap.

As discussed above, the positions (size) of the parked vehicles Cp1 and Cp2 are accurately calculated, and the parking range Ap, which serves as a parking space, is calculated from the detection positions. Thus, the parking space is calculated with higher accuracy.

In addition to advantages (1) to (7) of the first embodiment, the parking assistance device (parking space monitoring device) of the second embodiment has the advantage described below.

(8) The length Lx of the long axis of the detection range Bsi for the ultrasonic sensors 22 and 23 is greater than the overall length of the vehicle 1. Thus, in addition to the opening distance Lk of the opening of the parking space, the longitudinal distance Lo in the longitudinal direction may be used to calculate the parking space. Thus, the parking space is calculated with higher accuracy.

The above-discussed embodiments may be modified as described below.

In addition to calculating the parking space when performing perpendicular parking, a parking space may be calculated when performing parallel parking. When performing parallel parking in the first embodiment, the opening distance Lk is compared with a distance obtained by adding a marginal width to the overall length Lc0 of the vehicle 1. When performing parallel parking in the second embodiment, in addition to comparing the opening distance Lk with a distance obtained by adding the marginal width to the overall length Lc0, the longitudinal distance Lo is compared with the width Wc0 of the vehicle 1.

The mode shift switch 13 is used to switch between the obstacle detection mode and the parking space calculation mode when operated. However, the mode shift switch 13 may be eliminated so that only the parking space calculation is performed. A switch that is switched to perform or stop calculation of the parking space may be used. Further, at a location such as a parking lot in which parking may be performed in cooperation with a navigation system, the parking space calculation may be performed automatically.

The steering information is acquired from the steering angle sensor 11 as the movement information of the vehicle 1 to calculate the travel direction of the vehicle 1 and increase the accuracy of the travel direction. However, when it may be assumed that a change in the travel direction would be somewhat small, the steering angle information does not have to be included as the movement information of the vehicle 1. This would reduce information and decrease the computation amount.

A predetermined number of the detection positions Qi are deleted to calculate the parking space. However, detection positions Qi that are not included in a predetermined distance range may be deleted instead.

The parking space map M is optimized by deleting a predetermined number of the detection positions Qi from the detection positions Qi laid out on the parking space map M. However, when there is no need to decrease the computation amount or when noise does not cause erroneous detections, the optimization does not have to be performed.

The detection positions Qi are sequentially laid out on the parking space map M. However, after traveling by the section at which calculation of the parking space is desired or after traveling a predetermined distance, the detection positions Qi may be simultaneously laid out on the parking space map M.

The detection positions Qi are calculated based on the relative positions Pi and the movement information of the vehicle, the detection positions Qi are laid out on the parking space map M, and the parking space is calculated using the parking space map M. However, the relative positions Pi detected by the ultrasonic sensors 2, 3, 22, and 23 may be computed separately from the movement information of the vehicle 1 to calculate the parking space.

The detection ranges of the ultrasonic sensors 2 and 3 have the shape of a fan or a long oval but may have other shapes instead such as the shape of a circle.

Instead of using ultrasonic sensors, other sensors such as electromagnetic wave sensors may be used.

The invention claimed is:

1. A parking space monitoring device comprising:
    an obstacle detection unit that uses a relative distance and relative angle between an obstacle near a vehicle and the vehicle to detect a relative position of the obstacle with respect to the vehicle, the obstacle detection unit including a first ultrasonic sensor, which is used for both transmission and reception, and a second ultrasonic sensor, which is spaced apart from the first ultrasonic sensor and used for reception, wherein the first ultrasonic sensor and the second ultrasonic sensor each receive from the obstacle reflection waves of ultrasonic waves transmitted from the first ultrasonic sensor, and the obstacle detection unit calculates the relative distance and relative angle based on the received reflection waves to obtain the relative position;
    a memory that stores the relative position detected by the obstacle detection unit in association with movement information of the vehicle; and
    a parking space calculation unit that calculates a parking space based on the relative information and the movement information that are stored in the memory, wherein:
    the relative angle is an angle between a sensor normal, which extends through a sensor center between the first and second ultrasonic sensors and is perpendicular to a sensor surface of the first and second ultrasonic sensors, and a line segment, which connects the sensor center and a position of the obstacle detected by the first and second ultrasonic sensors;
    the obstacle detection unit calculates the relative angle from a reception time difference of the first ultrasonic sensor and the second ultrasonic sensor and a sensor distance between the first and second ultrasonic sensors;
    the obstacle detection unit calculates the relative distance from a reception time of either one of the first and second ultrasonic sensors that is located closer to the obstacle and firstly receives the reflection waves from the obstacle; and
    the parking space calculation unit is configured to:
        lay out a plurality of detection positions of the obstacle on a two-dimensional map based on the relative position and the movement information,
        leave, among the plurality of detection positions laid out on the two-dimensional map, a predetermined number of detection positions, or detection positions in a predetermined distance range, in front of and behind a non-detection section in which there is continuously no detection and eliminate the other detection positions to optimize the two-dimensional map, and
        determine the parking space by calculating a non-detection distance over which the non-detection section extends.

2. The parking space monitoring device according to claim 1, wherein:
    the parking space calculation unit sequentially lays out the detection position on the two-dimensional map whenever the relative position, which is detected as the vehicle moves, is stored in the memory.

3. The parking space monitoring device according to claim 1, wherein:
    the movement information includes steering angle information, and the memory stores the relative position associated with the steering information.

4. The parking space monitoring device according to claim 1, further comprising:
    a notification unit that gives notification of the presence of the obstacle based on the relative position detected by the obstacle detection unit; and
    a switching unit that selectively switches between an obstacle detection mode, which gives notification of the presence of the obstacle, and a parking space calculation mode, which calculates the parking space.

5. A method for monitoring a parking space, the method comprising:
    detecting an obstacle near a vehicle by a control unit with a first ultrasonic sensor, which is used for both transmission and reception, and a second ultrasonic sensor, which is spaced apart from the first ultrasonic sensor and used for reception, wherein the first ultrasonic sensor and the second ultrasonic sensor each receive from the obstacle reflection waves of ultrasonic waves transmitted from the first ultrasonic sensor;
    determining a relative position of the obstacle and the vehicle by calculating with the control unit a relative distance and relative angle between the obstacle and the vehicle based on the detection; and
    determining the parking space by the control unit based on the relative position and movement information of the vehicle, wherein:
    the relative angle is an angle between a sensor normal, which extends through a sensor center between the first and second ultrasonic sensors and is perpendicular to a sensor surface of the first and second ultrasonic sensors, and a line segment, which connects the sensor center and a position of the obstacle detected by the first and second ultrasonic sensors;

the control unit calculates the relative angle from a reception time difference of the first ultrasonic sensor and the second ultrasonic sensor and a sensor distance between the first and second ultrasonic sensors;

the control unit calculates the relative distance from a reception time of either one of the first and second ultrasonic sensors that is located closer to the obstacle and firstly receives the reflection waves from the obstacle; and the determining the parking space by the control unit includes:

laying out a plurality of detection positions of the obstacle on a two-dimensional map based on the relative position and the movement information, leaving, among the plurality of detection positions laid out on the two-dimensional map, a predetermined number of detection positions, or detection positions in a predetermined distance range, in front of and behind a non-detection section in which there is continuously no detection and eliminating the other detection positions to optimize the two-dimensional map, and determining the parking space by calculating a non-detection distance over which the non-detection section extends.

6. The parking space monitoring device according to claim 5, wherein:

the movement information includes steering angle information, and the memory stores the relative position associated with the steering information.

7. The parking space monitoring device according to claim 5, further comprising:

a notification unit that gives notification of the presence of the obstacle based on the relative position detected by the obstacle detection unit; and a switching unit that selectively switches between an obstacle detection mode, which gives notification of the presence of the obstacle, and a parking space calculation mode, which calculates the parking space.

8. The parking space monitoring device according to claim 2, wherein:

the movement information includes steering angle information, and the memory stores the relative position associated with the steering information.

9. The parking space monitoring device according to claim 2, further comprising:

a notification unit that gives notification of the presence of the obstacle based on the relative position detected by the obstacle detection unit; and a switching unit that selectively switches between an obstacle detection mode, which gives notification of the presence of the obstacle, and a parking space calculation mode, which calculates the parking space.

* * * * *